Nov. 18, 1924.

A. L. HAMILTON 1,516,097

APPARATUS FOR EDUCATIONAL PURPOSES

Filed Feb. 29, 1924  2 Sheets-Sheet 1

Inventor:
Albert L. Hamilton,
By his Atty, Harold D. Penney

Nov. 18, 1924.                                                1,516,097
                      A. L. HAMILTON
              APPARATUS FOR EDUCATIONAL PURPOSES
                    Filed Feb. 29, 1924        2 Sheets-Sheet 2

Inventor:
Albert L. Hamilton,
By his Atty, Harold D. Penney

Patented Nov. 18, 1924.

1,516,097

UNITED STATES PATENT OFFICE.

ALBERT L. HAMILTON, OF NEWARK, NEW JERSEY.

APPARATUS FOR EDUCATIONAL PURPOSES.

Application filed February 29, 1924. Serial No. 695,998.

*To all whom it may concern:*

Be it known that I, ALBERT L. HAMILTON, a citizen of the United States, and resident of Newark, in the county of Essex and State of New Jersey, have invented certain new and useful Improvements in Apparatus for Educational Purposes, of which the following is a specification.

My new invention relates to an improved method and apparatus for educational purposes, and has for its main object the presentation, for children, of a series of facts, in association with a series of pictures, whereby a child may be enabled to visualize from a picture, and to obtain the related facts, as associated therewith in print.

Another important object of my invention, as an educational unit, has to do with another related set of facts, or statements, which, while they are indirectly related to the object or article, are not intimately associated with the object which is the subject of its contained matter and therefore, these latter facts are preferably stated in an abstract manner, thereby permitting the child to use its logic and reason in applying such abstract data to the subject or object.

Another object of my invention relates to utilizing it as a means for creating amusement for children, by permitting them to associate distinctly unrelated subject matter with objects or vice versa, thereby causing merriment in a logically minded child, to whom obviously ridiculous or misplaced statements associated with non-related pictures or objects will cause much interest and entertainment.

These and other features will be disclosed as the description proceeds.

Figure 1:
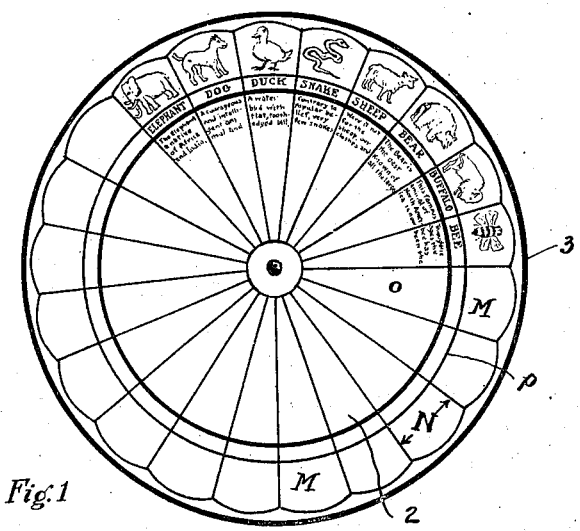
Figure 2:
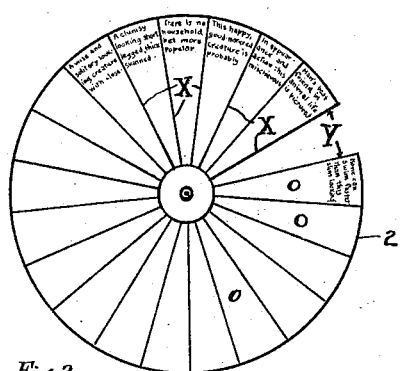
Figure 3:
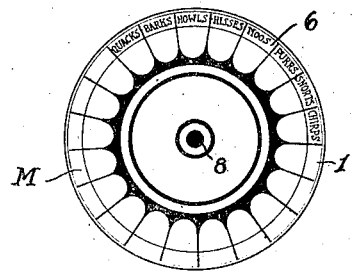
Figure 4:
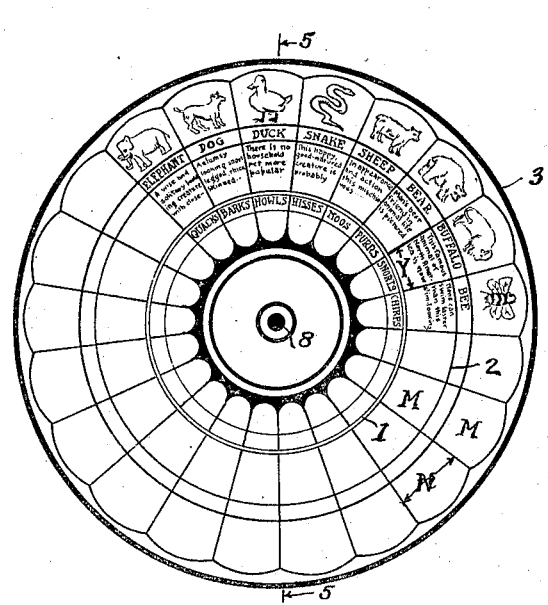

In the drawings, showing one embodiment of my invention Fig. 1 is a front view of the main or larger disc. Fig. 2 is a front view of the secondary disc. Fig. 3 is a front view of the third disc, all of which views show sheets separated. Fig. 4 shows a front view of the device and Fig. 5 shows a sectional view on line 5—5 of Fig. 4.

Figure 5:
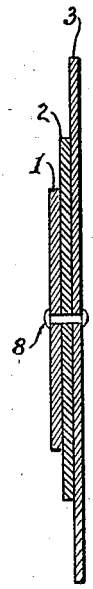

My device, as shown in the drawings may comprise any number of progressively larger card board sheets, 1, 2 and 3 that are superimposed, suitably connected at the center as Fig. 5 shows, by a staple 8 so that the various discs may be relatively rotated.

Each of the discs 1, 2 and 3 carry, near their outer edges, a series of illustrations, a pictorial or descriptive text, and the discs are progressively varied in diameter, so that the outer or main disc 3, carrying the complete device is the largest, the intermediate disc 2 is somewhat smaller, and the top disc 1 is the smallest of the group. A greater or lesser number of discs may be used than herein shown.

The progression of sizes in the above noted discs is so arranged as to leave exposed margins, generally denoted by M, and it is on these exposed margins that I arrange a series of related educational or descriptive or suggestive reading matter in such manner as to have some of such matter preferably, the descriptive, in fixed relation to the subject, preferably the suggestive or abstract in movable relation to said subject. All matter shown or illustrated upon the faces of the various discs 1, 2 and 3, is intended to be printed therein preferably in attractive colors and type.

As an illustration of the foregoing, reference may be had to Fig. 1, in which there is shown the major disc 3 having on its outer margin M, a series of illustrations of various animals, insects, etc., these being arranged one to each radical section N, of which there are twenty one shown. Only a few illustrations are shown in some of the said sectors, the others being left blank, in the present instance. It is understood however, that these blank spaces may be occupied by pictorial illustrations and reading matter in actual practice, and that any arbitrary number of sectors and illustrations may be used.

Immediately below each of the pictorial illustrations on the larger disc 3 are the names of the various animals, and below the names, in the same sectors are printed brief, easily read descriptions of the characteristics of each animal, or other object shown. Aside from the various marginal division lines P shown on this disc 3, no other reading matter is carried by this disc. Thus it will be seen that this disc 3 carries therein a series of fixed related groups of educational matter, which, as herein shown, covers zoology, etc., or any other subject within the childish scope may be utilized.

The second or intermediate disc 2, may contain as is shown in Fig. 2, an additional amount of abstract descriptive matter characteristic of some animal without indicating the animal by name, printed thereon, in sectors, which are provided by the separating radial lines X, thereby providing twenty-one sectors thereon arranged to register with the sectors on the major disc 3. However, the disc 2, has one sector cut out as at Y, (see Fig. 2) so that as superposed upon disc 3, there will be always one of the complete data or characteristic descriptive sectors exposed at Y, the disc 2 being of a diameter that will conceal disc 3 up to the position that will leave the animals and names exposed, (see Fig. 4) but completely covering the descriptive matter associated with the animals on disc 3, with the exception of the one cut-out sector Y on disc 2, in any rotative position.

In Fig. 3 I show a third disc denoted by 1 having sectors 6 at its marginal portion M which register with the sectors on the middle disc 2, when this disc is mounted on the pivot 8. As indicated in Figs. 4 and 5 this disc 1, is of smaller diameter whereby to expose the reading matter in the marginal sectors of the middle disk 2 as shown in Fig. 4. This smaller disk 1 is also provided with various reading matter at the outer portions of the sectors and as shown indicates the noise or cry made by various animals such as indicated on the outer disk 3.

In the use of the invention in the embodiment set forth, the intermediate disc 2 is turned, so that the open sector Y will be brought to register with and expose any desired sector on the larger disc 3, thereby permitting the descriptive, or other arbitrary or suggestive, reading matter on the larger disc on such sector beneath the object or animal and its title, so that the three can be read together, and such descriptive matter or text considered as associated with the animal or object. Thereupon the inner disc 1 can be turned to bring the reading matter on its marginal portions M to register these two discs and the statement thereon suggestive of the sounds each animal makes is read in connection with the pictorial matter on the disc 3 on the exposed portion of the sector. It will be seen that by turning this inner disc 1 the sound indicating matter 6 is brought to register which does not reasonably apply to such animal, and a ridiculous combination is thus produced, to the amusement of those viewing the device.

The middle disc 2 can further be brought to cause any one of its marginal sectors M containing its abstract reading matter to register with any of the outer portions of the sectors of the larger disc which are exposed beyond the normal margin of the middle disc, and thus the reading matter in any such sector of the middle disc 2 can be read and associated with the animal and its name on the outer disc, and a combination is effected thereby that does not apply and thus further amusing entertainment is afforded. In connection with the latter combination, the disc 1 can be also turned and any addition to the said descriptions of the outer disc sectors that will further complicate the descriptions and enhance the interest and amusement added.

The descriptions on disc 2 correspond to the illustrations on disc 1 but are arranged in a different order so that if one description relates to the associated illustration, the others will contrast with their associated illustrations.

What I claim is:

1. In combination, a lower disk divided into sectors each provided with an illustration of a complete object separated from other illustrations, and a disk rotatable on said lower disk and terminating short of the illustrations and provided with sectors corresponding to said illustrations and provided with descriptive matter corresponding to said illustrations.

2. In combination, a lower disk divided into sectors provided with illustrations of different objects and the names thereof; and a disk rotatable on said lower disk and terminating short of said names and illustrations and provided with sectors corresponding to said illustrations and provided with different descriptions corresponding to said illustrations but arranged in a different order so that if one description relates to the associated illustration, the others will contrast with their associated illustrations.

3. In combination, a lower disk divided into sectors each provided with an illustration of an animal and the name thereof, and descriptions related thereto; and a disk rotatable on said lower disk and terminating short of said names and illustrations and provided with sectors corresponding to said illustrations and adapted to cover said matter and provided with descriptive matter corresponding to said illustrations but arranged in a different order; one of said sectors being cut out and adapted for exposing any one of said descriptions.

4. In combination, a lower disk divided into sectors each provided with an illustration; a middle disk rotatable on said lower disk and terminating short of said illustrations and provided with spaces provided with descriptive matter corresponding to said illustrations; and an upper rotatable disk on the intermediate disk, terminating short of said matter and also provided with matter corresponding to said illustrations; all of said disks being concentric.

5. In combination, a lower disk divided into sectors each provided with an illustration of an animal; a middle disk rotatable on said lower disk and terminating short of said illustrations and provided with sectors corresponding to said illustrations and provided with descriptive matter corresponding to said illustrations; and an upper disk rotatable on the intermediate disk, terminating short of said matter and provided with words indicating noises characteristic of said animals, but arranged in a different order.

6. In combination, a lower disk divided into sectors each provided with an illustration of an animal, the name thereof, and descriptions related thereto; a middle disk rotatable on said lower disk and terminating short of the names and illustrations and provided with sectors corresponding to said illustrations and adapted to cover said descriptions and provided with descriptive matter corresponding to said illustrations but arranged in a different order; one of said sectors of the middle disk being cut out and adapted for exposing any one of said descriptions; and an upper rotatable disk on the intermediate disk, terminating short of said descriptions and matter and provided with words indicating noises corresponding to said illustrations, but arranged in a different order.

7. In combination, a lower disk divided into a plurality of sectors each divided into an outer space carrying an illustration of an animal, an intermediate space carrying the name of said animal, and an inner space carrying a description related to the animal of the same sector; a middle disk rotatably mounted on said lower disk and terminating short of said names; said intermediate disk being formed with a plurality of sectors corresponding to the sectors of the lower disk and provided with descriptive matter corresponding to said illustrations but arranged in a different order; one of said sectors of the intermediate disk being cut out and registerable with any one of the sectors of the lower disk; and an upper rotatable disk on the intermediate disk, terminating short of said matter and descriptions and divided into sectors provided with words indicating the noises made by said animals, said words being arranged in a different order from said animals.

Signed at 253 Broadway in the county of New York and State of New York this 28th day of February A. D. 1924.

ALBERT L. HAMILTON.